(12) United States Patent
Upatnieks

(10) Patent No.: US 7,051,956 B2
(45) Date of Patent: May 30, 2006

(54) EJECTOR DEVICE FOR DIRECT INJECTION FUEL JET

(75) Inventor: Ansis Upatnieks, Livermore, CA (US)

(73) Assignee: Sandia Naitonal Laboratories, Livermore, CA (US)

( * ) Notice: Subject to any disclaimer, the term of this patent is extended or adjusted under 35 U.S.C. 154(b) by 167 days.

(21) Appl. No.: 10/804,949

(22) Filed: Mar. 19, 2004

(65) Prior Publication Data
US 2004/0195397 A1 Oct. 7, 2004

Related U.S. Application Data

(60) Provisional application No. 60/456,534, filed on Mar. 20, 2003.

(51) Int. Cl.
*F23D 11/10* (2006.01)
(52) U.S. Cl. .................. 239/423; 239/424; 239/416.4; 239/416.5; 239/288; 239/589; 239/533.2; 239/585.1; 417/196; 60/740
(58) Field of Classification Search ........ 239/589–595, 239/288–288.5, 424, 431, 408; 60/737, 738, 60/751, 752, 740; 415/211.2; 417/196
See application file for complete search history.

(56) References Cited

U.S. PATENT DOCUMENTS

| 2,720,753 | A | * | 10/1955 | Sharpe ........................ 60/738 |
| 4,088,437 | A | * | 5/1978 | Holzapfel .................... 431/161 |
| 4,171,199 | A | * | 10/1979 | Henriques ................... 431/351 |
| 5,626,292 | A | * | 5/1997 | Armaroli et al. ........... 239/408 |
| 5,694,898 | A | * | 12/1997 | Pontoppidan et al. ....... 123/470 |

* cited by examiner

*Primary Examiner*—Dinh Q. Nguyen
(74) *Attorney, Agent, or Firm*—Timothy P. Evans

(57) ABSTRACT

Disclosed is a device for increasing entrainment and mixing in an air/fuel zone of a direct fuel injection system. The device comprises an ejector nozzle in the form of an inverted funnel whose central axis is aligned along the central axis of a fuel injector jet and whose narrow end is placed just above the jet outlet. It is found that effective ejector performance is achieved when the ejector geometry is adjusted such that it comprises a funnel whose interior surface diverges about 7° to about 9° away from the funnel central axis, wherein the funnel inlet diameter is about 2 to about 3 times the diameter of the injected fuel plume as the fuel plume reaches the ejector inlet, and wherein the funnel length equal to about 1 to about 4 times the ejector inlet diameter. Moreover, the ejector is most effectively disposed at a separation distance away from the fuel jet equal to about 1 to about 2 time the ejector inlet diameter.

6 Claims, 2 Drawing Sheets

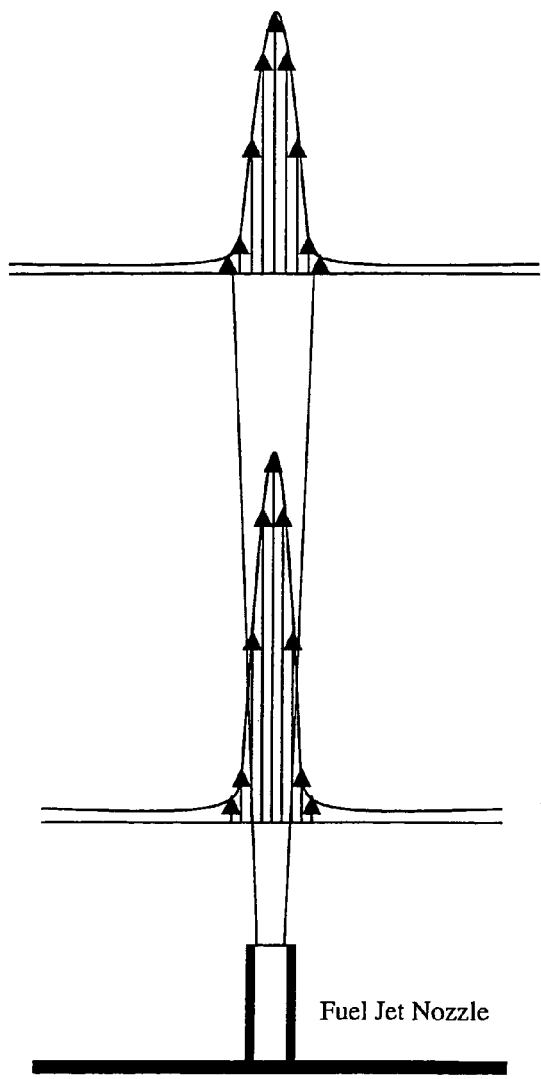
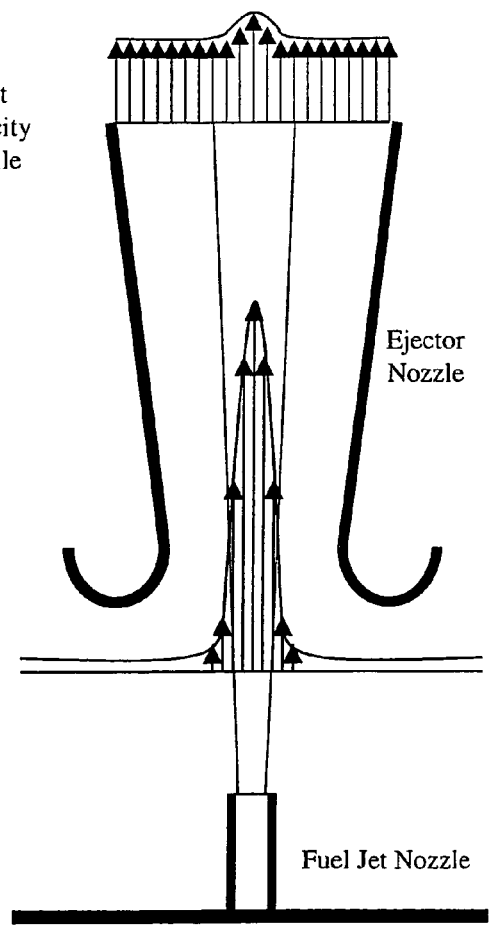
FIG. 1A
FIG. 1B

EJECTOR DEVICE FOR DIRECT INJECTION FUEL JET

CROSS REFERENCE TO RELATED APPLICATIONS

This application claims the benefit of U.S. Provisional Application No. 60/456,534 filed Mar. 20, 2003.

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

FIELD OF THE INVENTION

The invention is a device for increasing air entrainment and fuel/air mixing in direct injection fuel jets of internal combustion engines for the purpose of reducing in-cylinder pollutant production such as soot and $NO_x$. The novel in-cylinder ejector nozzle can be employed with a standard fuel injector to increase air entrainment and fuel/air mixing relative to an unaided standard injector.

BACKGROUND OF THE INVENTION

Compression-ignition direct-injection (CIDI) engines employ direct injection of high-velocity jets of fuel into the engine cylinder, where it combusts as it mixes with air. One of the major problems with CIDI engines is the production of unwanted pollutants such as soot and $NO_x$ in the in-cylinder combustion process. Previous research results have shown that combustion of incompletely mixed fuel/air in the high-speed injected jets is an important factor in pollutant production. Increasing air entrainment and fuel/air mixing in the injected fuel jets is therefore desirable to reduce engine pollutant production.

SUMMARY OF THE INVENTION

It is an object of this invention, therefore, for providing a means for increasing the air entrainment of direct injection fuel jets in internal combustion engines.

It is another object of this invention to provide a means for increasing the mixing of fuel and air in direct injection fuel jets.

It is yet another object of this invention to provide a device for reducing soot and $NO_x$ production in the in-cylinder combustion process.

Other objects and advantages will become apparent to those having skill in these arts upon reading the following detailed description of the present invention, the drawings and the appended claims.

BRIEF DESCRIPTION OF THE DRAWINGS

FIG. 1A shows the velocity profile of a fuel/air mix leaving a prior art fuel injector jet without an ejector nozzle.

FIG. 1B shows the velocity profile of a fuel/air mix leaving a prior art fuel injector jet with an ejector nozzle incorporated as part of the injector nozzle.

DETAILED DESCRIPTION OF THE INVENTION

Figure 2:
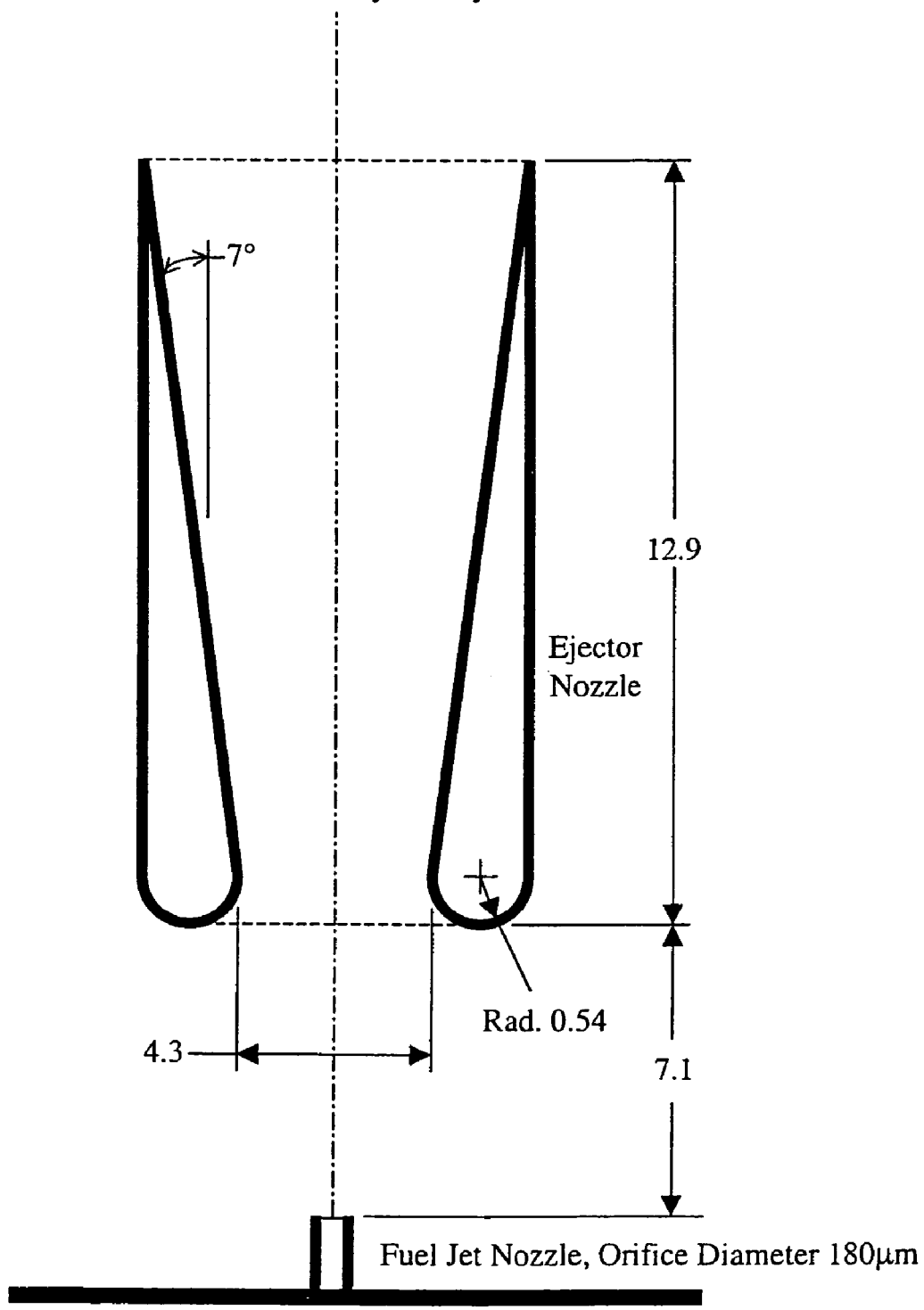
FIG. 2 illustrates a specific embodiment of an ejector nozzle of the present invention.

The invention is an in-cylinder device for increasing air entrainment and fuel/air mixing in high-speed direct-injection fuel jets in internal combustion engines. The device is an annular ejector nozzle located coaxially with the injection fuel jet so that the fuel jet passes directly through the ejector nozzle. The diameter of the ejector is larger than the diameter of the fuel jet to allow entrained air to flow through and mix with the injected fuel aerosol or spray. An axial separation distance between the ejector inlet and the fuel nozzle exit provides an open path for entrained air to flow into the ejector. The ejector inlet has a smooth radius to prevent flow separation and therefore maximize the amount of entrained airflow into it. The ejector is supported from or within the cylinder head by one or more posts, pylons, or stanchions for example.

The ejector nozzle provides partial confinement of the fuel jet, increasing air entrainment and mixing relative to the unaided jet. Air entrainment and fuel/air mixing rates are proportional to the mean fluid dynamic velocity gradient between the high-speed fuel jet and bounding slower speed gas flows or stationary combustion chamber walls. In a CIDI engine with a standard fuel injection configuration, the walls of the combustion chamber are far enough away from the fuel jet that they have relatively little influence on the fluid dynamics of the jet. As a result, the mean fluid dynamic velocity gradient between the fuel jet and the confining walls is relatively small, and the air entrainment and fuel/air mixing rates within the jet are also relatively small. In contrast, the ejector nozzle walls are closer to the jet than the combustion chamber walls, providing a larger mean velocity gradient and hence increased air entrainment and fuel/air mixing. For comparison, FIGS. 1A and 1B illustrate, respectively, the mean velocity and fuel/air fixture fraction profiles for fuel injector nozzles equipped either without (the prior art case) and with an ejector nozzle as described by the present embodiment.

The ejector nozzle also increases the liftoff distance of the flame from the fuel nozzle exit, providing an additional mechanism for increased air entrainment and fuel/air mixing. Previous research has shown that air entrainment and fuel/air mixing increases with increasing liftoff distance, while corresponding pollutant production decreases. In addition, the liftoff distance is extremely sensitive to the velocity of the air stream surrounding the fuel jet. Small increases in the surrounding air stream velocity lead to relatively large changes in the liftoff distance. The increased air entrainment provided by the ejector nozzle provides a large increase in the velocity of the air stream surrounding the fuel jet, leading to larger flame liftoff distances and commensurate reductions in pollutant formation.

EXAMPLE

The ejector nozzle dimensions are specified to accomplish the desired degree of air entrainment and fuel/air mixing within the ejector. The amount of air entrained and mixed with the fuel is directly proportional to the ejector inlet diameter. Typical dimensions for the ejector inlet diameter are equal to about 2 to about 3 times the diameter of the injected fuel plume as the fuel plume reaches the ejector inlet. The ejector length must be sufficient to accomplish effective fuel/air mixing within the length of the ejector. Typical ejector length dimensions are from about 1 to about 4 times the ejector inlet diameter. The distance of the injector inlet from the fuel jet exit must be sufficient to allow unobstructed flow of entrained air into the ejector. Typical injector inlet-to-fuel nozzle distances are 1 to 2 times the ejector inlet diameter. The ejector inlet further includes a fairing having a modest radius in order to provide a smooth transition into the nozzle to prevent flow separation and to provide unobstructed flow of entrained air into the ejector. The fairing used in the present embodiment may be in the form of a rolled edge providing an outwardly directed annulus, as shown in FIG. 1, or the ejector itself may comprise the streamlined structure as shown in FIG. 2. In this latter case the ejector is shown as an inverted funnel having a wedge-shaped cross-section which tapers to an apex at the outlet end and which comprises a radius across the width of the annular cross-section at each side of the opposite inlet end. Typical width dimensions of the annular cross-section are about 0.25 to about 0.4 times the ejector inlet diameter. The ejector nozzle diameter diverges at a shallow angle to accommodate the spreading angle of the fuel/air jet, typically a half angle of about 7° to about 9° from the vertical.

FIG. 2 provides a schematic of an ejector nozzle of the present embodiment and best mode. Dimension are shown in millimeters.

What is claimed is:

1. An ejector nozzle, comprising:
    a conical tube disposed about coaxially with a fuel injector nozzle, said conical tube comprising an interior wall and open inlet and outlet ends, wherein said inlet end is disposed adjacent to said fuel injector nozzle and comprises a diameter smaller then a diameter of said outlet end and a fairing structure comprising a smoothly curving edge, rolling outward from said inlet end and away from said interior wall at a constant radius; and
    means for supporting said conical tube at a fixed longitudinal distance equal to about 1 to 2 times said inlet diameter above from said fuel injector nozzle.

2. The ejector nozzle of claim 1, wherein said fairing structure comprises a rolled annulus having a cross-section width with a diameter of about 0.25 to about 0.4 times said inlet diameter.

3. The ejector nozzle of claim 1, wherein said fairing structure comprises a diameter about equal to the sum of said inlet diameter and twice said constant radius.

4. The ejector nozzle of claim 1, wherein said interior wall is angled outward from a central axis at about 7° to about 9°.

5. The ejector nozzle of claim 1, wherein said conical tube further comprises a length about equal to 1 to about 4 times said inlet diameter.

6. An ejector nozzle, comprising
    a conical funnel disposed about coaxially with a fuel injection nozzle, said conical funnel comprising:
        a length;
        an open inlet end having a first diameter;
        an open outlet end opposite said inlet end, said outlet end having a second diameter greater than said first diameter; and
        a substantially flat interior wall disposed between said inlet and said outlet ends and terminating at said inlet end in a rolled edge directed outward and away from said interior wall with a constant radius, said rolled edge comprises a fairing structure having a third diameter about equal to the sum of said first diameter and twice said constant radius; and
    means for supporting said conical duct above said injector nozzle at a longitudinal distance equal to about 1 to 2 times said first diameter from said inlet end.

* * * * *